US009300430B2

(12) United States Patent
Summer et al.

(10) Patent No.: US 9,300,430 B2
(45) Date of Patent: Mar. 29, 2016

(54) LATENCY SMOOTHING FOR TELEOPERATION SYSTEMS (71) Applicant: HARRIS CORPORATION, Melbourne, FL (US)

(72) Inventors: Matthew D. Summer, Melbourne, FL (US); Paul M. Bosscher, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 237 days.

(21) Appl. No.: 14/062,521

(22) Filed: Oct. 24, 2013

(65) Prior Publication Data
US 2015/0117466 A1 Apr. 30, 2015

(51) Int. Cl.
*H04L 1/00* (2006.01)
*H04L 12/26* (2006.01)
*B25J 9/16* (2006.01)

(52) U.S. Cl.
CPC ............. *H04L 1/0002* (2013.01); *B25J 9/1689* (2013.01); *H04L 1/0019* (2013.01); *H04L 43/0852* (2013.01); *G05B 2219/40147* (2013.01); *G05B 2219/40149* (2013.01); *G05B 2219/40151* (2013.01); *G05B 2219/40174* (2013.01)

(58) Field of Classification Search
CPC .......................... B25J 9/1689; H04L 43/0852
See application file for complete search history.

(56) References Cited

U.S. PATENT DOCUMENTS

| | | | | |
|---|---|---|---|---|
| 5,266,875 A * | 11/1993 | Slotine | ................... | B25J 9/1689 318/568.1 |
| 5,548,516 A | 8/1996 | Gudat et al. | | |
| 5,581,666 A * | 12/1996 | Anderson | ............... | B25J 9/1605 700/263 |
| 6,144,884 A | 11/2000 | Niemeyer et al. | | |
| 7,676,570 B2 * | 3/2010 | Levy | .................... | H04L 43/0852 709/224 |
| 7,747,729 B2 * | 6/2010 | Levy | .................... | H04L 43/0852 709/224 |
| 7,957,744 B2 * | 6/2011 | Oesterling | ............. | G07C 5/008 455/412.1 |
| 8,125,907 B2 * | 2/2012 | Averi | ...................... | H04L 45/00 370/232 |
| 8,171,152 B2 * | 5/2012 | White | ................. | H04L 43/0858 709/223 |

(Continued)

FOREIGN PATENT DOCUMENTS

| | | |
|---|---|---|
| FR | 2861191 | 4/2005 |
| WO | 2009/091536 | 7/2009 |

OTHER PUBLICATIONS

Information about Related Patents and Patent Applications, see section 6 of the accompanying Information Disclosure Statement Letter, which concerns Related Patents and Patent Applications.

*Primary Examiner* — Alpus H Hsu
(74) *Attorney, Agent, or Firm* — Fox Rothschild, LLP; Robert J. Sacco; Carol E. Thorstad-Forsyth (57) ABSTRACT Systems (100) and methods (700) for increasing a predictability of Telematic Operations ("TOs") of a Teleoperation System ("TS"). The methods involve: measuring an inherent latency of a Communications Link ("CL") of TS which varies unpredictably over at least a first window of time; analyzing the inherent latency, which was previously measured, to determine a first reference value useful for increasing the predictability of the TOs; using the first reference value to select an amount of controlled latency to be added to CL (120) at each of a plurality of time points (502-518); and adding the amount of controlled latency to CL at each of the plurality of time points so as to increase the predictability of the TOs. In some scenarios, the amount of controlled latency added at a first time point is different than the amount of controlled latency added at a second time point.

18 Claims, 6 Drawing Sheets

(56) References Cited

U.S. PATENT DOCUMENTS

| | | | | |
|---|---|---|---|---|
| 8,190,292 B2* | 5/2012 | Niemeyer | ............. | B25J 9/1689 |
| | | | | 700/2 |
| 8,274,891 B2* | 9/2012 | Averi | .................... | H04L 45/00 |
| | | | | 370/232 |
| 8,644,164 B2* | 2/2014 | Averi | .................... | H04L 45/00 |
| | | | | 370/238 |
| 8,661,218 B1* | 2/2014 | Piszczek | ............... | G06F 11/108 |
| | | | | 711/103 |
| 8,804,794 B2* | 8/2014 | Malkin | ................. | H04B 3/237 |
| | | | | 375/219 |
| 8,885,498 B2* | 11/2014 | Choi | .................... | H04W 4/006 |
| | | | | 370/252 |
| 8,918,215 B2* | 12/2014 | Bosscher | ............ | G05B 19/427 |
| | | | | 700/245 |
| 8,966,109 B2* | 2/2015 | White | ................. | H04L 43/0858 |
| | | | | 709/203 |
| 2006/0109376 A1 | 5/2006 | Chaffee et al. | | |
| 2006/0161647 A1* | 7/2006 | Wojtkiewicz | ....... | H04L 43/0852 |
| | | | | 709/224 |
| 2007/0058929 A1 | 3/2007 | Chaffee | | |
| 2007/0156286 A1 | 7/2007 | Yamauchi | | |
| 2008/0144563 A1* | 6/2008 | Hart | ................... | H04B 7/18584 |
| | | | | 370/316 |
| 2008/0276408 A1 | 11/2008 | Gilbert, Jr. et al. | | |
| 2009/0106491 A1* | 4/2009 | Piszczek | ............. | G06F 11/1076 |
| | | | | 711/114 |
| 2009/0157233 A1 | 6/2009 | Kokkeby et al. | | |
| 2009/0323657 A1* | 12/2009 | Gandham | ............. | G06F 9/4881 |
| | | | | 370/338 |
| 2010/0070079 A1 | 3/2010 | Mangaser et al. | | |
| 2010/0321203 A1* | 12/2010 | Tieman | ................... | B60R 25/24 |
| | | | | 340/870.01 |
| 2011/0087371 A1 | 4/2011 | Sandberg et al. | | |
| 2013/0244670 A1* | 9/2013 | Biermann | ............. | H04B 7/024 |
| | | | | 455/446 |
| 2013/0329584 A1* | 12/2013 | Ghose | ................... | H04L 45/586 |
| | | | | 370/252 |
| 2014/0095944 A1* | 4/2014 | Alexander | ............ | G06F 1/3253 |
| | | | | 714/48 |
| 2014/0181334 A1* | 6/2014 | Jeyaseelan | ............... | G06F 13/10 |
| | | | | 710/18 |
| 2014/0204743 A1* | 7/2014 | Garcia | .................... | H04L 47/18 |
| | | | | 370/231 |
| 2014/0219284 A1* | 8/2014 | Chau | .................. | H04L 12/2867 |
| | | | | 370/394 |
| 2014/0236518 A1* | 8/2014 | Hergesheimer | ......... | G01P 15/18 |
| | | | | 702/95 |
| 2014/0236519 A1* | 8/2014 | Hergesheimer | ......... | G01P 21/00 |
| | | | | 702/95 |
| 2014/0340257 A1* | 11/2014 | Basnayake | ............. | G01S 19/14 |
| | | | | 342/357.52 |
| 2014/0376427 A1* | 12/2014 | Hui | ........................ | H04L 69/04 |
| | | | | 370/296 |
| 2015/0298318 A1* | 10/2015 | Wang | .................... | B25J 9/1676 |
| | | | | 700/257 |

* cited by examiner

LATENCY SMOOTHING FOR TELEOPERATION SYSTEMS

BACKGROUND OF THE INVENTION

1. Statement of the Technical Field

The inventive arrangements relate to teleoperation systems and methods for the electronic remote control of unmanned machines. More particularly, the invention concerns teleoperation systems and methods for smoothing unpredictable latencies (or time delays) experienced in communications links (or data links) between controllers and remote unmanned machines.

2. Description of the Related Art

Teleoperation systems typically comprise hand controller systems for remotely controlling movement of an unmanned slave device via a wired or wireless communications link (or data link). In some scenarios, the remote control of the slave device is an Internet based control. In all cases, the slave device can include, but is not limited to, a robot, a robotic manipulator, an Unmanned Aerial Vehicle ("UAV"), an Unmanned Ground Vehicle ("UGV"), and/or an Unmanned Underwater Vehicle ("UUV"). During operation, a hand controller system (sometimes in the form of a joy stick or a pistol grip) senses the movement by a user's hand. Thereafter, the hand controller system generates one or more control messages. The control messages are sent over a wired or wireless data link to the slave device. At the slave device, the control messages are used for actuating various motion operations of the slave device. The control system of the slave device will respond to these control messages by activating certain servo-motors, solenoids, or other devices within the slave device to produce the desired action. Video cameras can be used to provide visual information to a remote operator regarding a work piece and/or the environment surrounding the slave device. Haptic technology can also be employed to provide tactile feedback by the teleoperation system to a user. The tactile feedback is typically provided by applying forces, vibrations and/or motions to one or more portions of the hand controller.

Notably, unpredictable inherent latency can be experienced in the data links between the hand control system and the slave device. For example, the slave device is a UGV with a radio. The UGV drives over a hill, whereby the remotely located human operator controlling the UGV loses Line Of Sight ("LOS") thereof. Also, the quality of communications link degrades. In this case, the inherent latency continuously varies unpredictably within, for example, a range of ten milliseconds to hundreds of milliseconds. The operator controlling the UGV is aware of the inherent latency between the time a control message is sent from the hand controller system and the time the control message is received by slave device. Consequently, the operator tries to mentally compensate for the inherent latency. In this regard, the operator tries to compensate for a relatively low inherent latency when the inherent latency is actually a relatively high inherent latency, or vice versa. In effect, the operator commands a movement of the slave device that is incorrect because the slave device is actually in a different location than that thought by the operator. As a result, the slave device may undershoot or overshoot a point or a target, thereby making the teleoperation system unpredictable. In the UAV scenarios, the unpredictable natural latency leads to unstable control of the UAV by the operator. The unstable control may cause the UAV to crash. One can appreciate that such unpredictable and unstable control of slave devices is undesirable, especially in a military and rescue contexts.

Many conventional systems do not implement any solutions to the variable inherent latency problem. In these systems, teleoperation commands are executed when they are received by the slave device. Also, video feedback is shown to the operator as it is received. Other conventional systems employ stabilization algorithms to address the variable inherent latency problem. In these systems, the stabilization algorithms prevent the systems from becoming dangerously unstable. For example, a system comprises a remotely controlled UAV. If the operator is providing incorrect commands as a result of the variable inherent latency, then a control system on the UAV rejects or modifies the commands received thereat so to prevent crashing of the UAV. Despite the advantages of the stabilization algorithms, they do not address the issue of predictability of the teleoperation systems.

SUMMARY OF THE INVENTION

The present invention concerns systems and methods for increasing a predictability of telematic operations of a teleoperation system. The methods comprise measuring an inherent latency of a communications link of the teleoperation system which varies unpredictably over at least a first window of time. The inherent latency is then analyzed to determine a first reference value useful for increasing the predictability of the telematic operations. The first reference value can include, but is not limited to, a peak value of a plurality of measured values for the inherent latency, one of the plurality of measured values which falls within a pre-defined threshold range, and/or an average of the plurality of measured values for the inherent latency.

Subsequently, the first reference value is used to select an amount of controlled latency to be added to the communications link at each of a plurality of time points. The amount of controlled latency to be added to the communications link at each time point can be: selected based on a difference between the first reference value and a measured value for the inherent latency at that time point; and/or selected to produce a constant overall latency for the communications link.

Next, the selected amount of controlled latency is added to the communications link at each of the plurality of time points so as to increase the predictability of the telematic operations. Notably, the amount of controlled latency added at a first time point is different than the amount of controlled latency added at a second time point. The controlled latency can be added to the communications link by time delaying a received message by an amount determined based on the first reference value and a current level of inherent latency of the communications link.

In some scenarios, the communications link comprises a forward communications link and the controlled latency is added to the communications link by a slave device of the teleoperation system. Alternatively or additionally, the communications link is a reverse communications link and the controlled latency is added to the communications link by a control unit of the teleoperation system operative to control a remotely located slave device.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects as illustrative. The scope of the invention is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments will now be described with respect to FIGS. 1-7. Embodiments generally relate to systems and methods for solving an unpredictable variable latency issue of a teleoperation system. As noted above, there is a variable amount of inherent latency associated with a communications link between a hand controller system and a remotely located slave device. As such, the present invention adds an additional amount of controlled latency to the communications link such that the sum total thereof is constant or substantially constant for the entire user operation of the teleoperation system. In some scenarios, the communications link is a forward communications link and/or a reverse communications link. Forward and reverse communications links are well known in the art, and therefore will not be described in detail herein. Still, it should be noted that, in a teleoperation context, a forward communications link, comprises a data link over which messages (e.g., control messages) are sent from a control unit to a remotely located slave device. In contrast, in the teleoperation context, a reverse communications link, comprises a data link over which messages (e.g., haptic feedback messages) are sent from the slave device to the control unit.

In some scenarios, the methods generally involve: continuously measuring an inherent latency of a communications link of the teleoperation system which varies unpredictably over a given period or window of time; analyzing the plurality of measured values for the inherent latency of the communications link to identify a first value thereof which constitutes a peak value, to identify at least one second value thereof which falls within a given threshold range, and/or to determine a third value which constitutes an average of the plurality of measured values for the inherent latency; using the first, second and/or third value(s) to select or determine an amount of controlled latency to be added to the communications link at each of a plurality of time points; and adding the amount of controlled latency to the communications link at each time point so as to provide a constant or substantially constant latency for the communications link in a forward and/or reverse direction. The amount of controlled latency added at each time point to the communications link is generally selected or determined based on the difference between the first, second and/or third value(s) and the measured value for the inherent latency at that time point. The above described process may be repeated for each of a plurality of periods or windows of time.

Notably, it is generally understood in the art that latency is undesirable in communication systems. As such, the present method of adding controlled latency to the communications link is a somewhat counter-intuitive way of addressing the variable inherent latency problem of teleoperation systems. However, by adding the additional controlled latency to the communications link, the teleoperation system has more predicable overall latency as compared to conventional teleoperation systems, such as those described in the background section of this document. Consequently, the teleoperation system of the present invention has superior overall telematic performance as compared to that of the conventional teleoperation systems.

Figure 1:
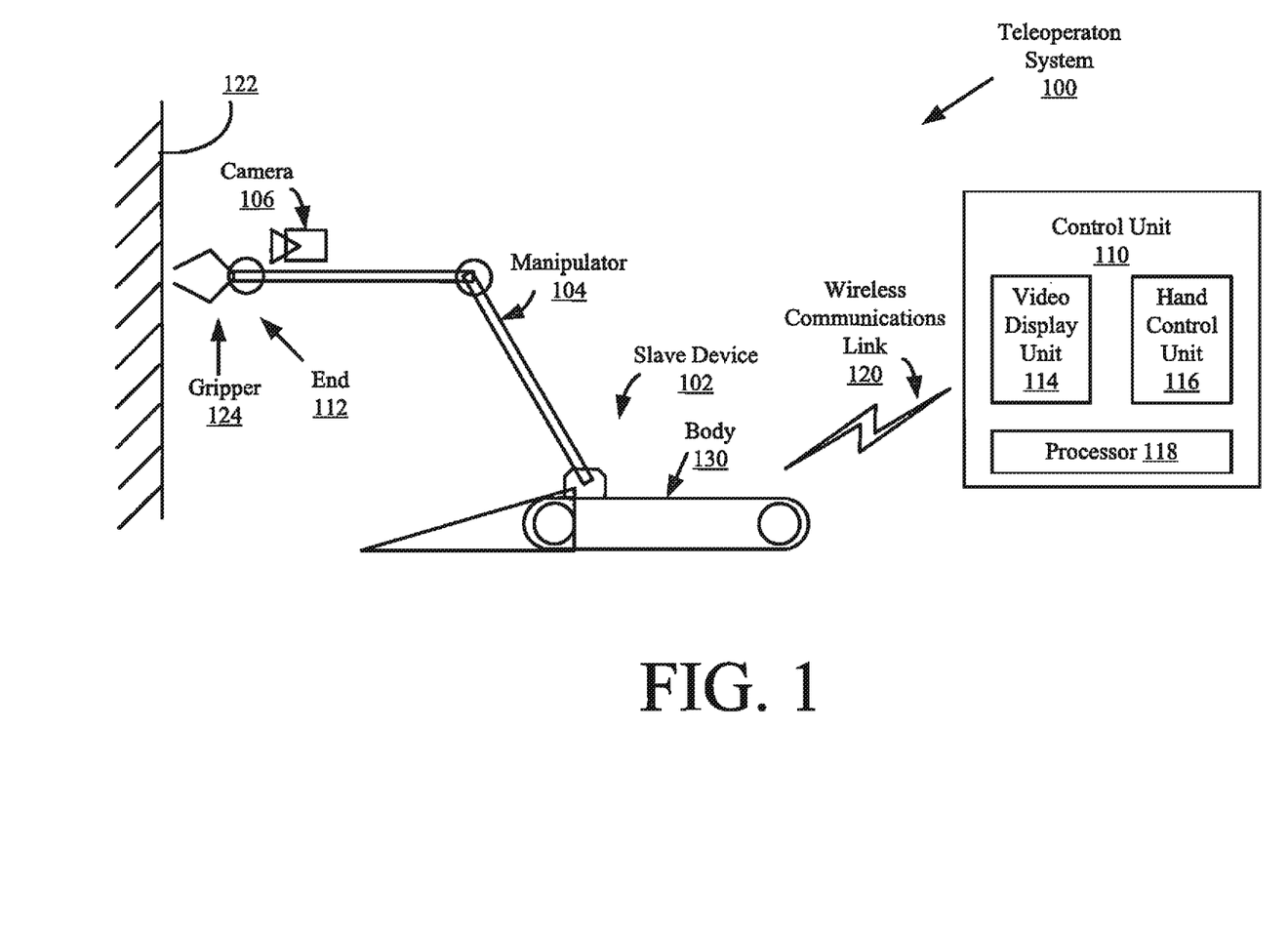
FIG. 1 is a block diagram of an exemplary teleoperation system that is useful for understanding the present invention.

Referring now to FIG. 1, there is provided a schematic illustration of an exemplary teleoperation system 100. The teleoperation system 100 is generally configured to allow an operator (not shown) to control a remotely located slave device 102. The slave device 102 can include any type of remotely controlled slave device or robot system capable of performing moving actions, manipulating actions, and/or grasping actions based on telematic commands received thereat. Accordingly, in some scenarios, the slave device 102 is a UGV as shown in FIG. 1. Embodiments of the present invention are not limited in this regard. The slave device 102 can alternatively comprise a UAV or a UUV, UGVs, UAVs and UUVs are well known in the art, and therefore will not be described in detail herein.

UGVs, UAVs and/or UUVs are often used by first responders or military personnel for search and rescue operations in hazardous and dangerous environments. For example, a UGV may be employed to find and disable an explosive device. In this regard, the slave device 102 may have a manipulator 104 with a camera 106 coupled to a distal end 112 thereof. In this example, the manipulator 104 comprises a robot arm extending from a body 130. The robot arm has a gripper 124 disposed at a distal end 112 thereof for contact, grasping or otherwise manipulating external objects 122 (e.g., an explosive device at least partially hidden under dirt or cloth). The body 130 includes hardware and/or software for controlling the operations of the slave device 102 such that it performs moving actions, manipulating actions, and/or grasping actions based on telematic commands received thereat. The telematic commands are generated by a control unit 110 in response to operator inputs thereto. The telematics commands are communicated from the control unit 110 to the slave device 102 via a wireless communications link 120 as shown in FIG. 1. In other scenarios, the telematic commands can be additionally or alternatively sent to the slave device 102 via a wired communications link (not shown).

The control unit 110 may be a mobile unit or a fixed unit capable of communicating with the slave device 102 via the wired and/or wireless communications link. In either scenario, the control unit 110 comprises a video display unit 114 for displaying a video image obtained from the camera 106. A Hand Control Unit ("HCU") 116 senses movements of an operator and communicates input signals specifying the sensed movements to the processor 118. The processor 118 processes each input signal to determine if a sensed movement corresponds to an element of a predetermined movement set of the teleoperation system 100. If the sensed movement corresponds to an element of the predetermined movement set, then the processor 118 generates a control message including a command for controlling the slave device 102 in a specified manner (e.g., move the manipulator up, down, forward, backward, to the right, and/or to the left). Thereafter, the control message is communicated from the control unit 110 to the slave device 102 via the wired and/or wireless communications link.

In response to the reception of the control message, the slave device 102 acts in the manner specified therein (e.g., moves the manipulator up, down, forward, backward, to the right, and/or to the left). Consequently, the manipulator 104 may physically engage an object 122. Force sensors (not shown) of the manipulator 104 detect forces exerted thereon as a result of the physical engagement. The information relating to the detected forces is communicated back to the control unit 110 via the wired and/or wireless communications link.

At the control unit 110, the information is then used to generate suitable tactile or haptic feedback for the user. The tactile or haptic feedback allows the physical engagement to be felt by the operator's hand, through the HCU 116. Accordingly, the tactile or haptic feedback may include linear forces and/or rotational forces applied to the HCU 116. Advantageously, the linear forces and/or rotational forces are directional forces such that the operator's sensation is more realistic than in conventional tactile or haptic feedback systems.

Notably, unpredictable inherent latency can be experienced in the wired and/or wireless communications link(s) between the HCU 116 and the slave device 102. For example, the slave device 102 drives over a hill, whereby the remotely located operator controlling the salve device 102 loses LOS thereof. Also, the quality of the wired and/or wireless communications link(s) degrade(s). In this case, the inherent latency of a communications link varies unpredictably within a range of, for example, ten milliseconds to hundreds of milliseconds. As such, the teleoperation system 100 employs a novel method for solving the unpredictable inherent latency issue. An example of such a novel method will be described below in relation to FIG. 7. Still, it should be understood that the method is at least partially implemented in the HCU 116 and/or the slave device 102.

The implemented method generally involves: continuously or periodically measuring an inherent latency of a communications link (e.g., a forward communications link and/or a reverse communications link) which varies unpredictably over a given period of time or window of time; analyzing a plurality of measured values for the inherent latency of the communications link to identify a first value thereof which constitutes a peak value, to identify at least one second value thereof which falls within a given threshold range, and/or to determine a third value which constitutes an average of the plurality of measured values for the inherent latency; using the first, second and/or third value(s) to select or determine an amount of controlled latency to be added to the communications link at each of a plurality of time points; and adding the amount of controlled latency to the communications link at each time point so as to provide an overall constant or substantially constant latency for the communications link. The amount of controlled latency added to the communications link at each time point is generally selected or determined based on the difference between the first, second and/or third value(s) and the measured value for the inherent latency thereof at that time point. The above described process may be repeated for each of a plurality of periods of time or windows of time. Therefore, the first, second and/or third value(s) can be variable values, i.e., different for at least two periods or windows of time. Also, the plurality of periods or windows of time can include overlapping and/or non-overlapping periods or windows of time.

As noted above, the amount of controlled latency added to the communications link is generally selected or determined based on the difference between the first, second and/or third value(s) and the measured value for the inherent latency at that time point. For example, a peak latency of 1.0 second was detected by the slave device 102 for a plurality of ping signals transmitted over a communications link at a regular time interval during a 10.0 second window of time. As such, the slave device 102 performs operations to provide a constant 1.0 second overall latency for command or control messages received thereat (e.g., telematics command messages). In this regard, an additional 0.5 seconds of controlled latency is added by the slave device 102 to the communications links at a first time point when it has an inherent latency of 0.5 seconds. In effect, a first command or control message is delayed by an amount selected or determined based on the current level of inherent latency of the communications link (e.g., delay=0.5 seconds). In contrast, no additional controlled latency is added by the slave device 102 to the communications link at a second time point when it has an inherent latency of 1.0 second or approximately 1.0 second (e.g., an inherent latency between 0.8 seconds and 1.0 seconds). Therefore, a second command or control message is delayed by an amount selected or determined based on the current level of inherent latency of the communications link (e.g., delay=0.0 seconds). Embodiments of the present invention are not limited to the particularities of this example.

Notably, it is generally understood in the art that latency is undesirable in communication systems. As such, the present method of adding controlled latency is a somewhat counter-intuitive way of addressing the variable inherent latency problem of teleoperation systems. However, by adding the additional controlled latency to the communications link, the teleoperation system has more predicable overall latency as compared to conventional teleoperation systems, such as those described in the background section of this document. Consequently, the teleoperation system of the present invention has superior overall telematic performance as compared to such conventional teleoperation systems.

The present invention will now be described in more detail in relation to the scenario where the novel method is implemented in both the HCU 116 and the slave device 102. The present invention is not limited in this regard, as recited above. For example, the novel method can be implemented in only of the HCU 116 or only the slave device 102.

Figure 2:
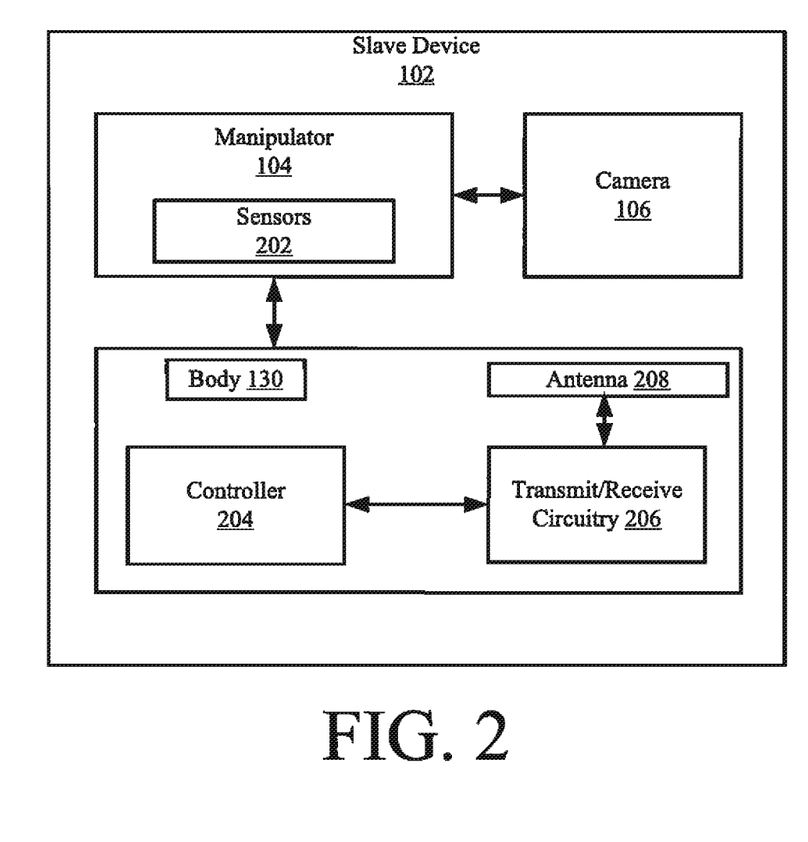
FIG. 2 is a block diagram of an exemplary architecture for the slave device shown in FIG. 1.

Referring now to FIG. 2, there is provided a more detailed block diagram of an exemplary architecture for the slave device 102 that is useful for understanding the present invention. As shown in FIG. 2, the body 130 of the slave device 102 comprises a controller 204, transmit/receive circuitry 206 and an antenna 208. The transmit/receive circuitry 206 and an antenna 208 facilitate the wireless communication between the slave device 102 and the control unit 110. The slave device 102 can alternatively or additionally comprise a system interface (not shown) to facilitate the wired communication between the slave device 102 and the control unit 110. Such communication components are well known in the art, and therefore will not be described herein. Any known transmit/receive circuitry, antenna, and/or system interface can be used with the present invention without limitation.

The controller 204 is configured to receive ping signals and/or control messages from the control unit 110. The ping signals are provided to facilitate the continuous and/or periodic measurement of an inherent latency of a communications link in at least a forward direction (i.e., a direction from the control unit 110 to the salve device 102). The control messages can also facilitate the measurement of the inherent latency. In this regard, the ping signals and/or the control messages include timestamps indicating the time that they were sent from the control unit 110. The timestamps allow the slave device 102 to determine measured values for the inherent latency of the communications link which varies unpredictably over a given period or window of time. Once a pre-defined number of measured values for the inherent latency of the communications link have been obtained, the controller 204 analyzes the measured values to: (1) identify the peak value(s) thereof; (2) identify value(s) thereof which fall(s) within a given threshold range; and/or (3) to determine an average thereof. Next, the controller 204 performs operations to provide a constant overall latency or a substantially constant overall latency (e.g., a latency of ≤1 second) for the communications link in a forward direction. These operations involve adding an amount of controlled latency to the communications link at each time point, where the amount of controlled latency is selected or determined based on the difference between the first, second and/or third value(s) and the measured value for the inherent latency at that time point. Stated differently, a received control message is delayed by an amount selected or determined based on the current latency level of the communications link.

In some scenarios, the controller 204 generates a response message for each received ping signal and/or control message. The response message is then sent in a reverse direction over the wired and/or wireless communications link (i.e., in a direction from the slave device 102 to the control unit 110). The response message can include one or more timestamps. For example, the response message includes a first timestamp indicating the time that the respective ping signal or control message was received by the slave device 102 and/or a second timestamp indicating the time that the response message was sent from the slave device 102. The first and/or second timestamps facilitate various operations by the control unit 110 for solving the unpredictable inherent latency issue with regard to the communications link in the reverse direction. Such operations will be described in detail below in relation to FIG. 4.

The time delayed control messages are then further processed by the controller 204 to obtain motion control commands therefrom. The controller 204 then causes the slave device 102 to perform certain actions in accordance with the motion control commands. For example, the slave device 102 may be caused to move the body 120 in a forward direction, a backward direction, a right direction and/or a left direction. Additionally or alternatively, the slave device 102 may be caused to move the manipulator 104 in a linear motion and/or a rotational motion. The manipulator 104 can be a robot arm including one or more mechanical joints. Robot arms of this type are well known in the art, and therefore will not be described in detail herein. However, a brief description of one example of a manipulator 104 is provided to assist the reader in understanding the present invention.

Figure 3:
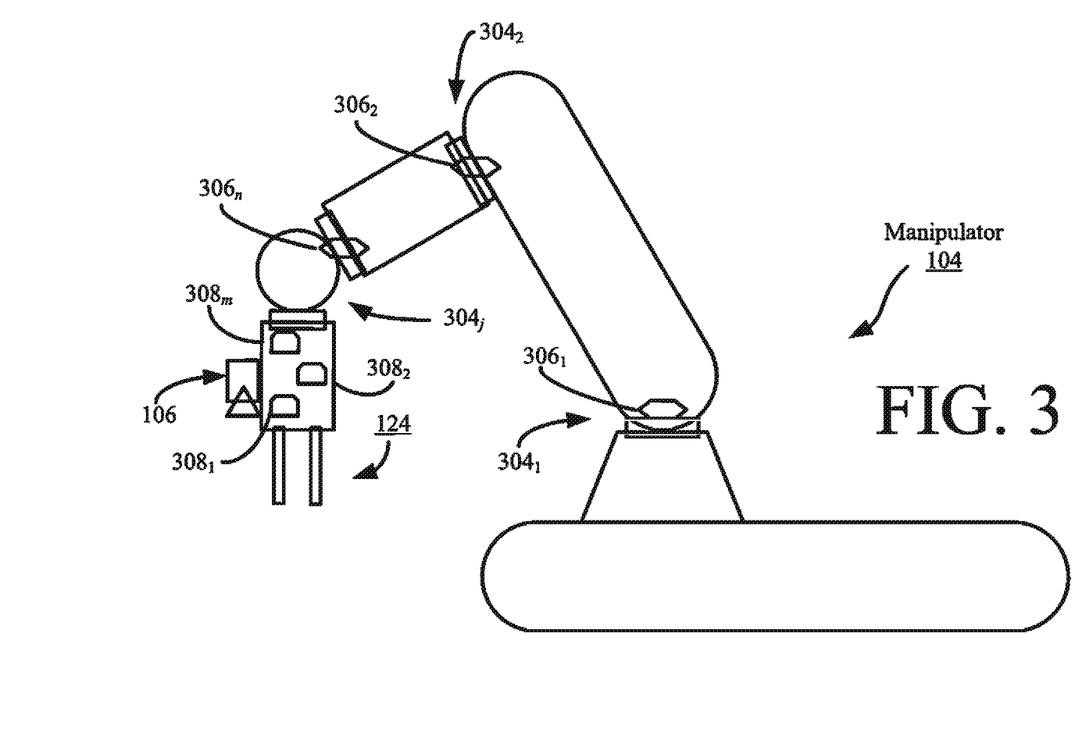
FIG. 3 is a schematic illustration of an exemplary architecture for the manipulator shown in FIG. 2.

Referring now to FIGS. 2 and 3, the manipulator 104 can include a gripper 124, servo-motors (not shown), sensors $306_1, 306_2, \ldots, 306_n$, and a camera 106 mounted thereon. The servo-motors are configured for moving one or more mechanical joints $304_1, 304_2, \ldots, 304_j$ in a direction and at a velocity determined by the motion control commands. As noted above, the motion control commands are received from the control unit 110. The sensors $306_1, 306_2, \ldots, 306_n$ are configured to detect the position of the mechanical joints $304_1, 304_2, \ldots, 304_j$, respectively. Information relating to the detected positions can be provided to the controller 204 for further processing. In turn, the controller 204 may communicate such information to the control unit 110 for tactile or haptic feedback purposes.

At least one sensor $308_1, 308_2, \ldots, 308_m$ may be provided for detecting forces exerted upon the manipulator 104. In this regard, the sensors $308_1, 308_2, \ldots, 308_m$ are configured to detect forces (i.e., linear and/or rotational forces) exerted upon the manipulator 104 and the gripper 124. In FIG. 3, three (3) force sensors are shown at the base of the gripper 124, but the invention is not limited in this regard. More or fewer force sensors can be advantageously arranged to measure linear and/or rotational forces exerted upon the manipulator 104 when the manipulator 104 physically contacts or touches materials or surfaces in the environment. In some scenarios, the sensors $306_1, 306_2, \ldots, 306_n, 308_1, 308_2, \ldots, 308_m$ are arranged so that the position and forces exerted upon the manipulator 104 are measured with respect to as many as three (3) orthogonal linear axes (x, y, z) and as many as three (3) axes of rotation.

The data from the sensors $306_1, 306_2, \ldots, 306_n, 308_1, 308_2, \ldots, 308_m$ is communicated to the controller 204, which performs any necessary data formatting before communicating the data to transmit/receive circuitry 206. The information is then transmitted from the antenna 208 to the control unit 110 in one or more haptic feedback messages. The haptic controls messages can each include one or more timestamps, as described above.

Figure 4:
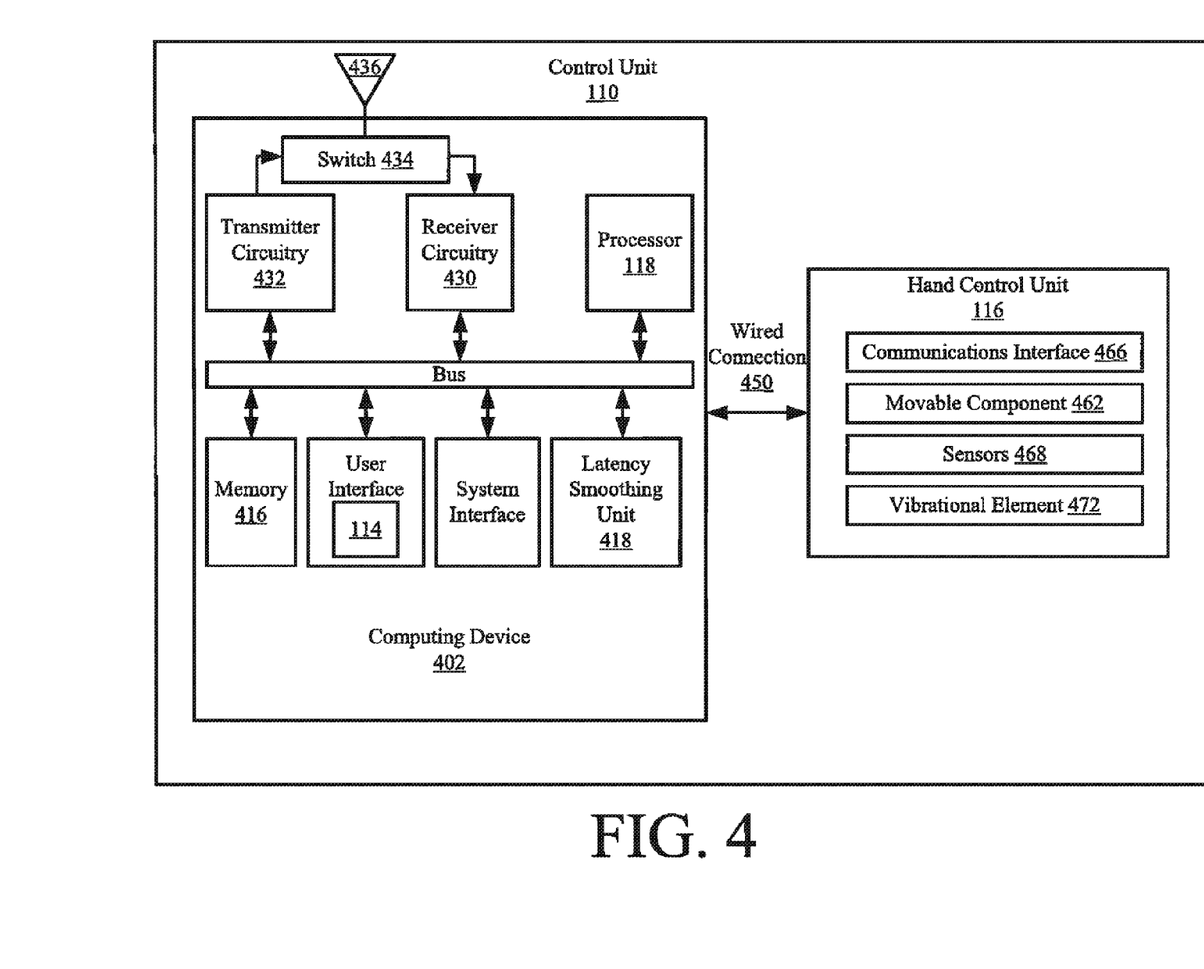
FIG. 4 is a block diagram of an exemplary architecture for the control unit shown in FIG. 1.

Referring now to FIG. 4, there is provided a more detailed diagram of the control unit 110. The control unit 110 is advantageously designed to: provide an intuitive control interface for commanding slave device motion; enable six Degree of Freedom ("DOF") motion inputs; and provide directional force-feedback or haptic-feedback to the user. The control unit 100 is also configured to be rugged, durable, easily portable and compact. These features of the control unit 100 will become more evident as the discussion progresses.

The control unit 110 is configured to generate ping signals. Each ping signal includes at least one timestamp. The timestamp can indicate the time that the ping signal was sent from the control unit 110 to the slave device 102. The ping signals are then communicated from the control unit 110 to the slave device 102 via a wired or wireless communications link. As noted above, the timestamps of the ping signals can be used by the slave device 102 to provide a constant or substantially constant overall latency for the communications link in at least the forward direction. As also noted above, the slave device 102 may generate and send response messages to the control unit 110. In this regard, the control unit 100 is configured to receive the response messages and process the same. Time stamps of the response messages can be used by the control unit 110 to provide a constant or substantially constant overall latency for the communications link in at least the reverse direction, as described below.

As shown in FIG. 4, the control unit 110 comprises a computing device 402 and the HCU 116. The computing device 402 and HCU 116 may be communicatively coupled to each other via a wired connection and/or a wireless connection (not shown). The HCU 116 is a full haptic controller. As such, the HCU 116 comprises a movable component 462 designed to allow a user to grasp a handle portion (not shown) thereof. The user may manipulate the movable component 462 for purposes of remotely controlling a slave device 102. The movable component 462 is configured to ensure that the movement of the handle portion is physically restricted to or constrained within a defined area (e.g., an area of a two-foot square). The handle portion and/or movable component 462 include one or more sensors 468 to detect movement thereof along one, two or three orthogonal axes of motion and/or a rotational axes of motion. The sensors 468 include, but are not limited to, accelerometers, gyroscopes, flex sensors and/or any other sensor that can detect and track movements of an object to which it is attached. Hand controllers of this type are well known in the art, and therefore will not be described in more detail herein. Still, it should be understood that information relating to the detected movement of component 462 is communicated from the sensors 468 to the computing device 402 via communications interface 466. In turn, the computing device 402 generates motion control commands for purposes of remotely controlling a pose of a slave device 102 in accordance with user input commands. The motion control commands are communicated in control messages sent from the computing device 402 to the slave device 102 via the transmit circuitry 432, 434, 436.

As described above, the slave device 102 processes the control messages to improve the overall latency of the communications link in at least the forward direction prior to acting in the manner specified by the motion control commands. In response to the motion control commands, the slave device 102 can travel in a forward direction, a backward direction, a right direction, and/or a left direction. Additionally or alternatively, the manipulator 104 of the slave device 102 may be caused to move in a linear or rotational motion. In some scenarios, the manipulator 104 may physically engage an object 122. Force sensors $308_1, 308_2, \ldots, 308_m$ of the manipulator 104 detect forces exerted thereon as a result of the physical engagement. The information relating to the detected forces is communicated back to the control unit 110 within haptic feedback messages. The haptic feedback messages are received by the control unit 110 via the receive circuitry 436, 434, 430 thereof. The haptic feedback messages can each comprise one or more timestamps. For example, each haptic feedback message can include a first timestamp indicating that time that a particular ping signal or control message was received by the slave device 102 and/or a second timestamp indicating the time that the haptic feedback message was sent from the slave device 102.

At the control unit 110, the timestamp(s) of the response messages and/or haptic feedback messages are then used to provide a constant overall latency or a substantially constant overall latency (e.g., latency ≤1 second) for the communications link in at least a reverse direction. In this regard, the control unit 110 is configured to perform one or more of the following operations: continuously measure an unpredictable inherent latency of the communications link in at least the reverse direction over a given period of time or window of time; analyze the measured values for the latency to identify a first value thereof which constitutes a peak value, to identify at least one second value thereof which falls within a given threshold range, and/or to determine a third value which constitutes an average of the measured values for the inherent latency; use the first, second and/or third value(s) to select or determine an amount of controlled latency to be added to the communications link (in at least the reverse direction) at each of a plurality of time points; and add the amount of controlled latency to the communications link at each time point. The amount of controlled latency added to the communications link at each time point is generally selected or determined based on the difference between the first, second and/or third value(s) and the measured value for the inherent latency of the communications link at that time point. Stated differently, a received message (e.g., a haptic feedback message) is delayed by an amount selected or determined based on the current level of inherent latency of the communications link (e.g. delay=difference between the first, second and/or third value(s) and the measured value for the inherent latency of the communications link at that time point). The above described process may be repeated for each of a plurality of periods of time or windows of time.

The delayed received messages (e.g., haptic feedback messages) are then further processed by the control unit 110 to obtain the information contained therein. The information is then used to generate suitable tactile or haptic feedback for the user. The tactile or haptic feedback allows the physical engagement to be felt by the user's hand, through the handle portion of the movable component 462. Accordingly, the tactile or haptic feedback may include linear forces and/or rotational forces applied to the handle portion of the movable component 462.

In some scenarios, the tactile or haptic feedback is directional such that the user's sensation is more realistic (i.e., the force applied to the slave device is exactly or substantially duplicated such that the user will feel the same or similar force). For example, if the manipulator 104 squeezes an object, then the force is applied to the user's hand via the handle portion of the movable component 462 such that the user experiences the same or similar sensation as the manipulator 104 as a result of said squeezing. In some scenarios, the duplicated "squeeze-resulting" force is applied to at least one of the user's finger via a trigger mechanism. Similarly, if a right surface of manipulator 104 rubs against a ruff surface of an object, then an internal component of the movable component 462 is actuated such that the handle portion thereof shakes in the right direction so as to mimic the vibration experienced by the manipulator 104 as a result of said rubbing.

Accordingly, one or more vibrational elements 472 can be provided internal to the HCU 116. The vibrational elements 472 can include, but are not limited to, a first vibrational element that can cause the HCU 116 to shake in the left and/or right direction, a second vibrational element that can cause the HCU 116 to shake in the up and/or down direction, and/or a third vibrational element that can cause the HCU 116 to shake in a front and/or back direction. Any combination of the vibrational elements can be actuated to shake the HCU 116 is one or more directions at any given time. A determination as to which vibrational element(s) to actuate at a particular time can be made based on results of a translation process. The translation process involves translating a spatial direction associated with the force applied to the slave device 102 to a coordinate direction associated with the handle portion of the HCU 116. The coordinate direction is determined based on an orientation of the user's hand relative to an orientation of the handle portion. One or more orientations can be detected using any known or to be known sensors which are configured to detect an orientation of an object relative to a pre-defined reference orientation, point, object and/or axes.

Although the control unit 110 was described above to measure inherent latency of signals sent in only one direction (i.e., a reverse direction). The present invention is not limited in this regard. For example, in some scenarios, the control unit 110 may additionally or alternatively be configured to continuously/periodically detect and measure a inherent latency of a communications link in a forward direction and/or an inherent cumulative latency of the communications link in both the forward and reverse directions. The measured values for the inherent cumulative latency can then be used to provide a constant overall latency for signals communicated within the teleoperation system 100.

Figure 5:
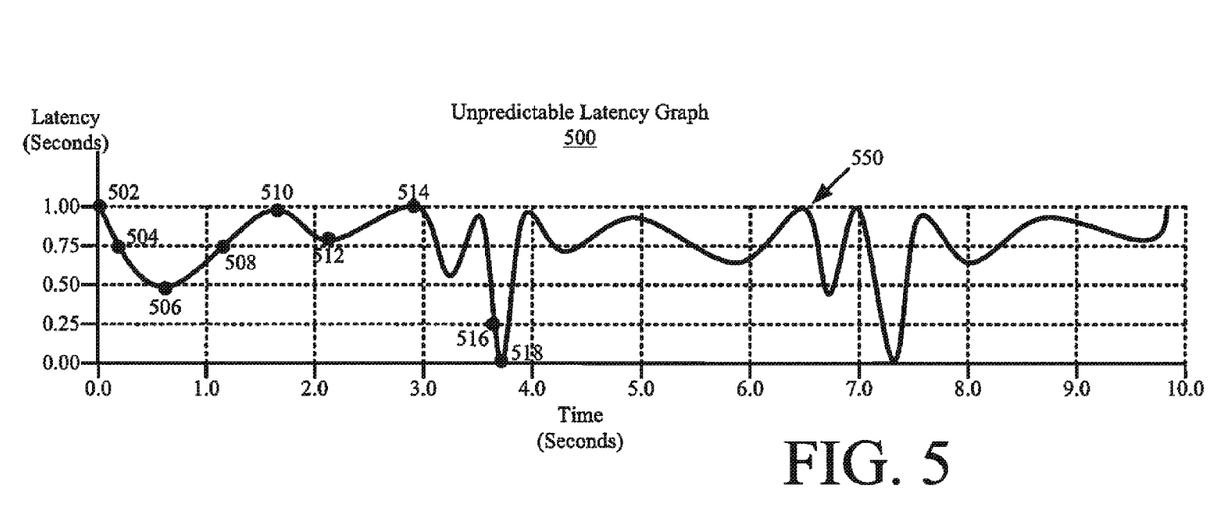
FIG. 5 is a graph showing an unpredictable inherent latency over a given period of time that is useful for understanding the present invention.

Referring now to FIG. 5, there is provided a graph 500 showing a latency of a communications link over a given period of time that is useful for understanding the present invention. The graph comprises a latency axis which is measured in seconds and a time axis which is also measured in seconds. The relationship between the latency and time is schematically illustrated by line 550 of the graph 500. As shown by line 550, the latency varies over a range of 0.00 seconds to 1.00 second. As such, operation of the teleoperation system is unpredictable. One can appreciate that it is desirable to eliminate this unpredictability of the teleoperation system.

Figure 6:
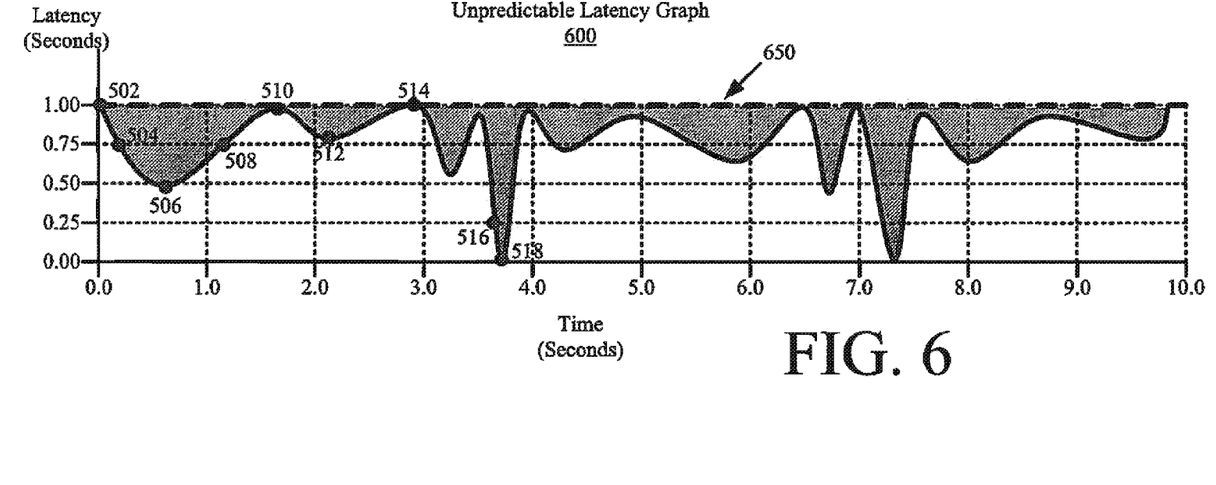
FIG. 6 is a graph that is useful for understanding how a constant overall latency can be provided to a teleoperation system which has the unpredictable inherent latency of FIG. 5.

Graph 600 of FIG. 6 shows how such unpredictability can be removed from the teleoperation system in accordance with the present invention. As shown in FIG. 6, additional controlled latency (illustrated in the shading between lines 550 and 650) is added to the inherent latency of the communications link (illustrated by line 550) so as to obtain a constant or substantially constant overall latency (illustrated by line 650) therefore. The amount of controlled latency that is added to each time point of a signal communicated over the communications link depends on the difference between the inherent latency thereof and the desired constant or substantially constant overall latency value (e.g., 1 second). For example, no controlled latency is added to the signal at time points 502, 520 and 514. In contrast, 0.25 seconds of controlled latency is added to the signal at time points 504 and 508. Slightly less than 0.25 seconds of controlled latency is added to the signal at time point 512. 0.75 seconds of controlled latency is added to the signal at time point 516. 1.00 second of controlled latency is added to the signal at time point 518. Embodiments of the present invention are not limited to the particularities of the example shown in FIGS. 5-6.

Figure 7:
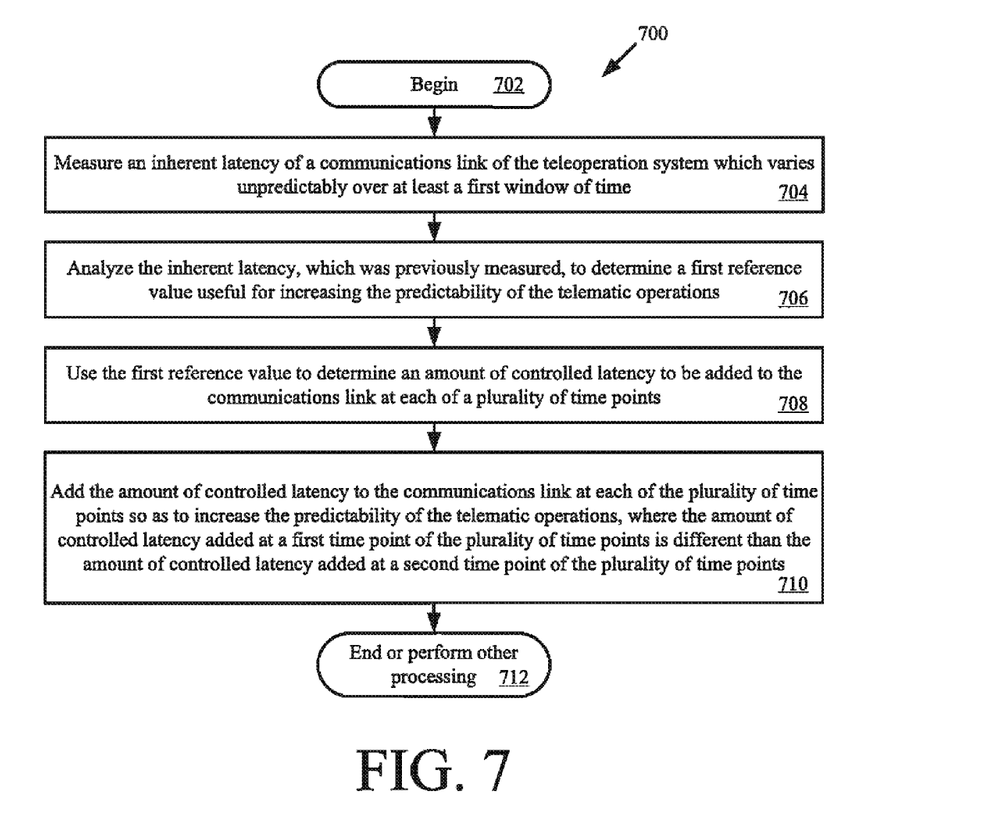
FIG. 7 is a flow diagram of an exemplary method for solving an upredictable inherent latency issue of a teleoperation system that is useful for understanding the present invention.

Referring now to FIG. 7, there is provided a flow diagram of an exemplary method 700 for solving an unpredictable inherent latency issue of a teleoperation system (e.g., teleoperation system 100 of FIG. 1). Method 700 begins with step 702 and continues with step 704. Step 704 involves measuring an inherent latency of a communications link of the teleoperation system which varies unpredictably over at least a first window of time. Next, in step 706, the inherent latency, which was previously measured, is analyzed to determine a first reference value useful for increasing the predictability of the telematic operations. The first reference value can include, but is not limited to, a peak value of a plurality of measured values for the inherent latency, one of the plurality of measured values which falls within a pre-defined threshold range, and/or an average of the plurality of measured values for the inherent latency.

The first reference value is then used in step 708 to select an amount of controlled latency to be added to the communications link at each of a plurality of time points. The amount of controlled latency to be added to the communications link at each time point can be: selected based on a difference between the first reference value and a measured value for the inherent latency at that time point; and/or selected to produce a constant overall latency for the communications link.

Subsequently, the selected amount of controlled latency is added to the communications link at each of the plurality of time points so as to increase the predictability of the telematic operations, as shown by step 710. Notably, the amount of controlled latency added at a first time point of the plurality of time points is different than the amount of controlled latency added at a second time point of the plurality of time points. The controlled latency can be added to the communications link by time delaying a received message by an amount determined based on the first reference value and a current level of inherent latency of the communications link.

In some scenarios, the communications link comprises a forward communications link and the controlled latency is added to the communications link by a slave device of the teleoperation system. Alternatively or additionally, the communications link is a reverse communications link and the controlled latency is added to the communications link by a control unit of the teleoperation system operative to control a remotely located slave device.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for increasing a predictability of telematic operations of a teleoperation system for conveying information over a network to remotely control of a slave device, comprising:
   measuring, by the slave device or a control unit of the teleoperation system, an inherent latency of a communications link of the teleoperation system which varies unpredictably over at least a first window of time, where the inherent latency comprises a latency between a time a control message is sent from the control unit to a time the control message is received by the slave device;
   analyzing, by the slave device or control unit, the inherent latency, which was previously measured, to determine a first reference value that can be used to increase the predictability of the telematic operations;
   using, by the slave device or control unit, the first reference value to select an amount of controlled latency to be added to the communications link at each of a plurality of time points; and
   adding, by the slave device or control unit, the amount of controlled latency to the communications link at each of the plurality of time points so as to increase the predictability of the telematic operations, where the amount of controlled latency added at a first time point of the plurality of time points is different than the amount of controlled latency added at a second time point of the plurality of time points.

2. The method according to claim 1, wherein the communications link is a forward communications link and the controlled latency is added to the communications link by the slave device.

3. The method according to claim 1, wherein the communications link is a reverse communications link and the controlled latency is added to the communications link by the control unit.

4. The method according to claim 1, wherein the first reference value comprises a peak value of a plurality of measured values for the inherent latency.

5. The method according to claim 1, wherein the first reference value comprises one of the plurality of measured values which falls within a pre-defined threshold range.

6. The method according to claim 1, wherein the first reference value comprises an average of the plurality of measured values for the inherent latency.

7. The method according to claim 1, wherein the amount of controlled latency to be added to the communications link at each time point is selected based on a difference between the first reference value and a measured value for the inherent latency at that time point.

8. The method according to claim 1, wherein the amount of controlled latency to be added to the communications link at each time point is selected to produce a constant overall latency for the communications link.

9. The method according to claim 1, wherein the controlled latency is added to the communications link by time delaying a message received at the control unit or the slave device by an amount determined based on the first reference value and a current level of inherent latency of the communications link.

10. A teleoperation system for electronic remote control of a slave device, comprising:
    a control unit communicatively coupled to the slave device which is remotely located from the control unit, where at least one of a computing device of the control unit and a controller of the slave device is configured to:
    measure an inherent latency of a communications link of the teleoperation system which varies unpredictably over at least a first window of time, where the inherent latency comprises a latency between a time a control message is sent from the control unit to a time the control message is received by the slave device;
    analyze the inherent latency, which was previously measured, to determine a first reference value that can be used to increase a predictability of telematic operations for conveying information over a network to remotely control of the slave device;
    use the first reference value to select an amount of controlled latency to be added to the communications link at each of a plurality of time points; and
    add the amount of controlled latency to the communications link at each of the plurality of time points so as to increase the predictability of the telematic operations, where the amount of controlled latency added at a first time point of the plurality of time points is different than the amount of controlled latency added at a second time point of the plurality of time points.

11. The teleoperation system according to claim 10, wherein the communications link is a forward communications link.

12. The teleoperation system according to claim 10, wherein the communications link is a reverse communications link.

13. The teleoperation system according to claim 10, wherein the first reference value comprises a peak value of a plurality of measured values for the inherent latency.

14. The teleoperation system according to claim 10, wherein the first reference value comprises one of the plurality of measured values which falls within a pre-defined threshold range.

15. The teleoperation system according to claim 10, wherein the first reference value comprises an average of the plurality of measured values for the inherent latency.

16. The teleoperation system according to claim 10, wherein the amount of controlled latency to be added to the communications link at each time point is selected based on a difference between the first reference value and a measured value for the inherent latency at that time point.

17. The teleoperation system according to claim 10, wherein the amount of controlled latency to be added to the communications link at each time point is selected to produce a constant overall latency for the communications link.

18. The teleoperation system according to claim 10, wherein the controlled latency is added to the communications link by time delaying a message received at the control unit or the slave device by an amount determined based on the first reference value and a current level of inherent latency of the communications link.

* * * * *